United States Patent [19]

Inbar

[11] 4,429,226

[45] Jan. 31, 1984

[54] METHOD OF AND MEANS FOR IMPROVING THE RESOLUTION OF A GAMMA CAMERA

[75] Inventor: Dan Inbar, Haifa, Israel

[73] Assignee: Elscint, Inc., Boston, Mass.

[21] Appl. No.: 377,367

[22] Filed: May 12, 1982

Related U.S. Application Data

[63] Continuation-in-part of Ser. No. 149,335, May 13, 1980.

[51] Int. Cl.³ .............................................. G01T 1/20
[52] U.S. Cl. .............................. 250/363 S; 250/363 S
[58] Field of Search ............. 250/361 R, 363 R, 363 S, 250/366, 369, 252

[56] References Cited

U.S. PATENT DOCUMENTS

| | | | |
|---|---|---|---|
| 3,011,057 | 11/1961 | Anger | 250/363 S |
| 4,060,730 | 11/1977 | Zioni et al. | 250/363 S |
| 4,095,108 | 6/1978 | Inbar et al. | 250/363 S |
| 4,151,416 | 4/1979 | Richey et al. | 250/363 S |
| 4,223,388 | 9/1980 | Nishikawa et al. | 250/363 S |
| 4,228,515 | 10/1980 | Genna et al. | 250/363 S |

*Primary Examiner*—Janice A. Howell
*Attorney, Agent, or Firm*—Sandler & Greenblum

[57] ABSTRACT

The intensity distribution of a radiation field imaged on a scintillation crystal of a gamma camera can be quantified by assigning to each elemental area of the crystal, a number representing the number of light events calculated to have occurred in the given elemental area within a predetermined period of time. The resolution of the camera is improved by weighting the contents of the elements in the memory in accordance with the probability that an event, calculated to have occurred in a given elemental area, actually occurred therein, such that the weighted contents of the memory more closely approaches the actual density distribution of light events as compared to the unweighted contents of the memory.

28 Claims, 10 Drawing Figures

LIGHT EVENTS IN CRYSTAL AT $x_1, y_1$

POINT SOURCE OF GAMMA RAYS

ELEMENT IS $N(x, y)$

ELEMENT IS $C(x, y)$

ELEMENT IS $N'(x, y)$
$N'(x, y) = N(x, y) C(x, y)$

ACTUAL CALIBRATION POINT
DISPLACED CALIBRATION POINT
CALCULATED LOCATION OF EVENT

AVERAGE DISTRIBUTION FOR AN EVENT AT $x_0, y_0$

OUTPUT OF PHOTOMULTIPLIERS A – G

EVENT OCCURS

METHOD OF AND MEANS FOR IMPROVING THE RESOLUTION OF A GAMMA CAMERA

CROSS-REFERENCES TO RELATED APPLICATIONS

This application is a continuation-in-part of copending application Ser. No. 149,335 filed May 13, 1980.

The following patents, dealing with gamma cameras and techniques for computing the coordinates of light events, are hereby incorporated by reference:

[1] U.S. Pat. No. 3,011,057 in the name of Hal Anger.
[2] U.S. Pat. No. 4,060,730 in the names of Jacob Zioni, Yitzhak Klein, and Dan Inbar.
[3] U.S. Pat. No. 4,095,108.

BACKGROUND OF THE INVENTION

This invention relates to gamma cameras, and more particularly to a method of and means for improving the resolution of such cameras.

As is well known, a conventional gamma camera has a scintillation crystal responsive to radiation stimuli for producing light events in the crystal at locations where the stimuli interact with the lattice structure of the crystal. An array of photomultipliers operatively associated with the crystal responds to light events for producing individual outputs which are processed by computation circuitry that computes the coordinates of each light event.

In preparation for displaying the intensity distribution of a radiation field imaged on the crystal and producing light events therein, it is conventional to accumulate a representation of the density distribution of events in the crystal by utilizing a matrix of storage registers whose elements are in one-to-one correspondence with elemental areas of the crystal. Each time a light event occurs in the crystal, its coordinates are calculated, and the contents of the element in the matrix comprehending such coordinates is incremented. Thus, contents of a given element of the matrix is a number that represents the number of events that have occurred within a predetermined period of time within an elemental area of the crystal which corresponds to the location of the given element in the matrix. Such number is directly proportional to the intensity of radiation emitted from an elemental area of the radiation field with which the given element of the matrix is associated. Therefore, by using this number to establish the brightness of a picture element of a display corresponding to the elements of the matrix, the intensity distribution of a radiation field can be displayed in terms of the brightness distribution of the display.

In a conventional gamma camera of the type disclosed in Reference [1], the coordinates of a light event are computed by operating on the output signals of the photomultipliers. Specifically, the so-called "center of gravity" of the photomultiplier signals is computed by assigning a weight to each photomultiplier in accordance with its location relative to a coordinate axis in the crystal, multiplying the weight of a photomultiplier by its output, summing all of the weighted outputs of the photomultipliers, and dividing the sum by the number of photomultipliers. For reasons well known to those skilled in the art, a computed location of a light event may be displaced from its actual location in the crystal. As a consequence, an image produced from a matrix whose contents are developed in this manner is not always an accurate reproduction of the actual radiation field. Accuracy can be improved if compensation is made for non-linearities in the system.

One approach is disclosed in Reference [2] where the computation is done in a step-by-step process that involves first coarsely determining the general location of an event and then utilizing a predetermined function of the outputs of photomultipliers close to the general location in order to compute the coordinates of the event. Another approach is disclosed in Reference [3] wherein a calibration map or matrix is obtained for a given gamma camera and the computed coordinates are modified in accordance with the calibration map. In no case, however, have these expedients been fully successful in correcting the inherent problems in gamma cameras of accurately displaying an image of a radiation field.

It is therefore an object of the present invention to provide a new and improved method of and means for improving the resolution of a gamma camera of the type described above.

SUMMARY OF THE INVENTION

Each element in a matrix representing the density distribution of light events in a scintillation crystal of a gamma camera is weighted in a way that improves the resolution of the camera. The weight of an element is in accordance with the probability that an event, calculated to have occurred in a given elemental area to which the element corresponds, actually occurred therein. In one embodiment of the invention, such probability is calculated using a calibration procedure that involves impinging a calibrating beam of gamma rays on the crystal at known locations, and utilizing the gamma camera to compute the location of the events. The average calculated location of events due to impingement of the calibrating beam on a fixed point in the crystal is derived, and the distance of the average calculated location from the known location of the event is inversely related to the probability that an event calculated to have occurred at calibration point actually occurred there. Thus, the calibration procedure provides a measure of confidence that an event, calculated to have occurred in the given elemental area actually occurred therein.

The calibration procedure can also be by way of associating with the calculated coordinates of an event, an average distribution of outputs of the photomultipliers of the camera representative of the distribution due to the occurrence of a number of events at the calculated coordinates. The probability that an event occurred at the calculated coordinates will be related to the cross-correlation between the average distribution with the actual distribution of outputs. Thus, a weight related to the probability that an event calculated to have occurred at a given location actually occurred at that location can be assigned to each event, on an event-by-event basis, and the result stored in a memory for display. In this calibration procedure, the average distribution can be obtained analytically in accordance with the spatial distribution of photomultipliers, or, preferably, by an actual calibration procedure which includes creating a number of events at each of a plurality of known locations in the crystal, and recording the average distribution of outputs for each known location. The known locations can be limited to one motif of a repeating pattern of the array of photomultipliers, or can extend over the entire face of the crystal. Interpolation can be used to determine the average distribution at locations computed by the camera during the study of an unknown radiation field, where such locations do not coincide with the calibration locations.

BRIEF DESCRIPTION OF THE DRAWINGS

Embodiments of the invention are illustrated in the accompanying drawings wherein.

DETAILED DESCRIPTION

Figure 1:
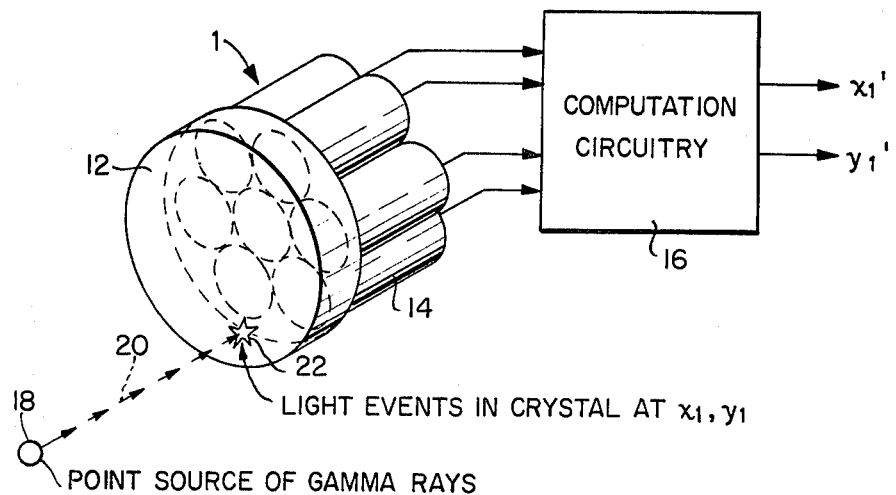
FIG. 1 is a perspective view of a gamma camera head and the computation circuitry associated therewith for the purpose of showing the manner in which a calibration procedure is carried out.

Referring now to FIG. 1, reference numeral 1 designates a conventional gamma camera which may be of the type shown in Reference [1]. Camera 1 comprises a scintillation crystal 12 responsive to radiation stimuli emitted from a radiation field for producing light events in the crystal at locations where the stimuli interact with the lattice structure of the crystal. An array of photodetectors, such as photomultipliers 14 is operatively associated with the crystal and responds to light events for producing individual outputs which are processed by computation circuitry 16 for the purpose of computing the coordinates of each light event. A point source of gamma rays 18 produces a beam 20 of gamma rays, in cooperation with a suitable collimator (not shown) whereby the beam impinges upon the crystal 12 at location 22 (x1,y1) producing light events at the known location. In a conventional manner, computation circuitry produces a pair of coordinate signals $x1'$, $y1'$ which represent the coordinates of the light event at location x1,y1. Normalization of the coordinate signals achieved by dividing the coordinate signals by the total energy of a light event is carried out but is omitted from the block diagram for simplification purposes.

Figure 2:
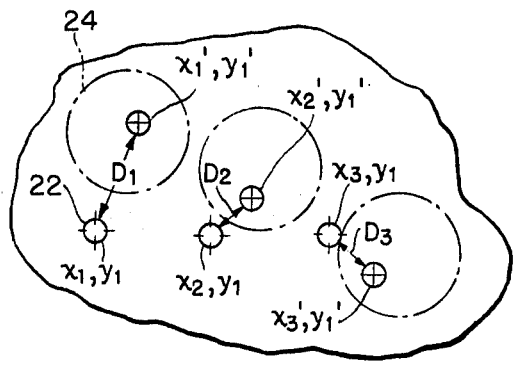
FIG. 2 is a fragmentary view of a portion of the scintillation crystal of the gamma camera head showing three elemental areas of the crystal and the average calculated location of events actually occurring in the three elemental areas.

The point source is maintained at a fixed location relative to the crystal for a period of time sufficient to allow a relatively large number of light events, say 1000, to occur, and for computations of the coordinates of the events to be computed for comparison purposes. This situation is illustrated in FIG. 2 wherein the actual coordinates of the light event 22 are indicated as being x1,y1, while the chain line 24 represents the boundary within which are contained all of the coordinate points computed by circuitry 16 for events actually occurring at x1,y1. After a relatively large number of coordinate points have been computed, the average coordinates, or actually, the coordinates of the center of gravity of all of the coordinates, namely $x1',y1'$ are computed by conventional procedures. The distance D1 between the known location of the light events x1,y1 and the average calculated location of the events, $x1'$, $y1'$, is what is termed hereinafter a calibration distance associated with the elemental area of the crystal corresponding to the coordinates x1,y1.

Figure 3:
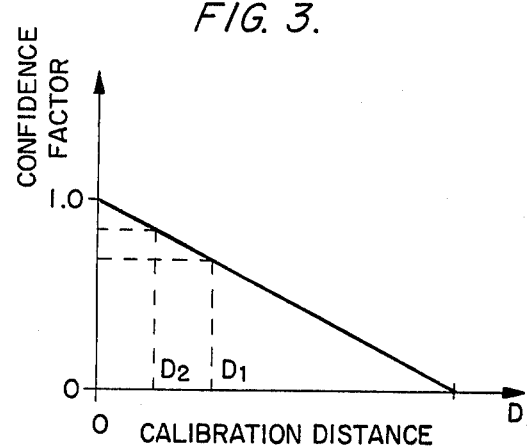
FIG. 3 is a representation of the functional relationship between the correction factor for elemental areas of the crystal and the distance of the average location of an event from its actual location.

Using a curve such as shown in FIG. 3, the calibration distance can be converted into a confidence factor which is functionally related to the inverse of the calibration distance. For example, if the calibration distance is zero, which is to say that the coordinates of the calculated events are the same as the actual coordinates of the event, the confidence factor would be 1 or 100%. Such a situation might exist where the light event occurs on the geometric center of a photomultiplier.

On the other hand, a calibration distance which is relatively large would have a lower confidence factor near zero. This situation might arise when a light event occurs near the periphery of the crystal in a region between photomultipliers. In any event, the confidence factor so obtained is associated with the average coordinates $x1',y1'$ and is stored in a correction matrix at an address associated with the average coordinates.

Figure 5:
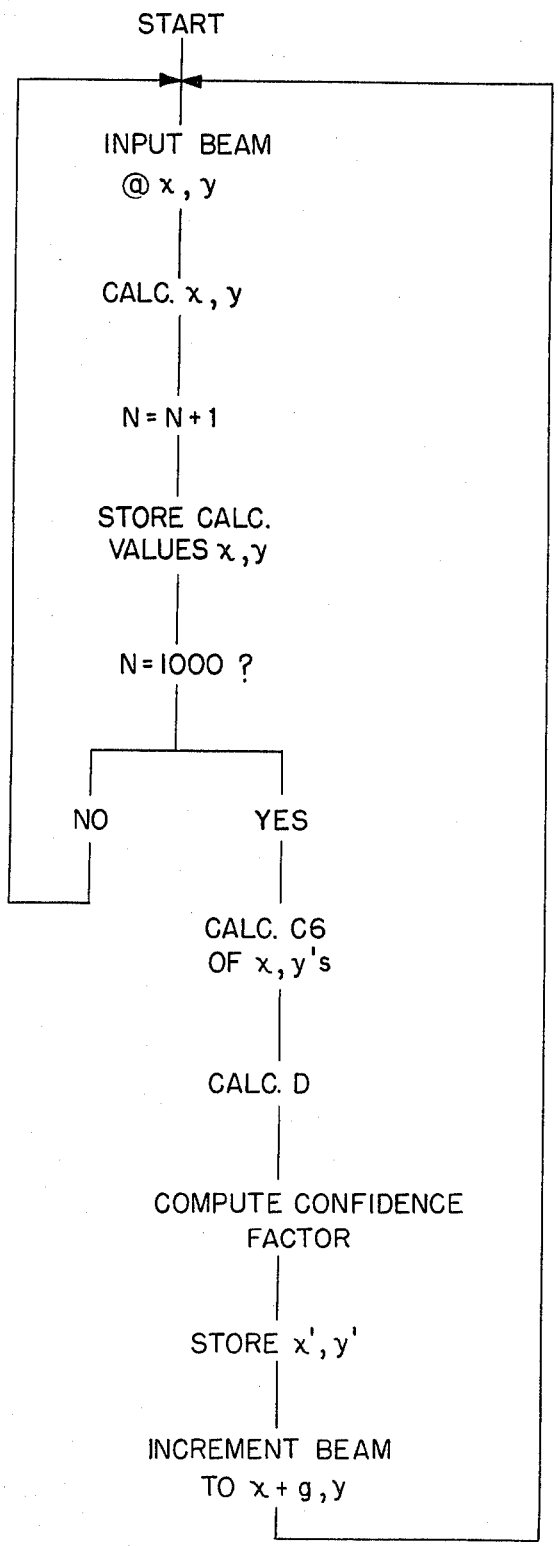
FIGS. 5 and 6 are alternative flow diagrams illustrating different techniques for calibrating the gamma camera.

The process is then repeated by displacing the point source of gamma rays until the beam impinges on point x2, y1 of the crystal, and the process described above is repeated to find the calibration distance associated with the location $x2',y1'$. As described previously, another confidence factor is calculated based on the calibration distance D2 and stored in a correction matrix at a location corresponding to the coordinates $x2',y1'$. This procedure is repeated until the entire surface of the crystal 12 has been covered. A flow chart showing this procedure is illustrated in FIG. 5 wherein it is assumed that 1,000 light events will be required in order to compute each calibration distance. This is merely illustrative of the invention and other numbers could be utilized.

Figure 6:
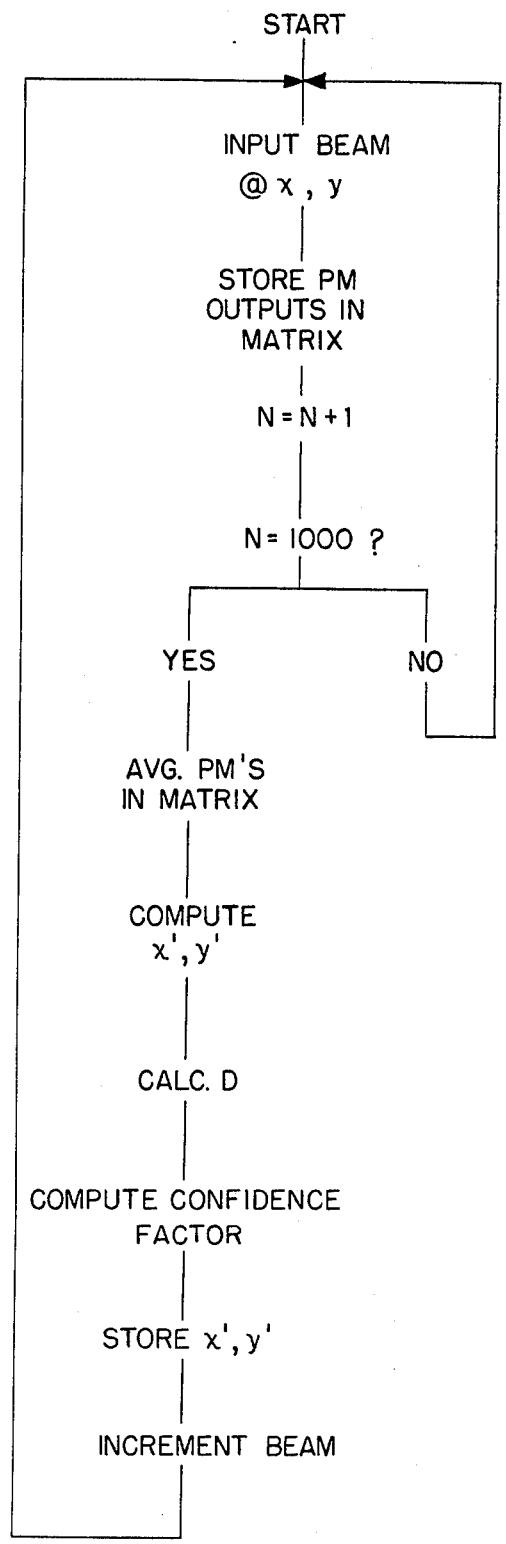

FIG. 6 represents a flow chart for computing the confidence factors at the various elements in the correction matrix by storing the photomultiplier outputs rather than utilizing the computation circuitry as indicated in FIG. 5. Referring now to FIG. 6, the point source of gamma rays would produce a beam impinging on the crystal at a known location giving rise to a output at each of the photomultipliers of the array associated with the scintillation crystal. For example, there may be 19 photomultipliers associated with the crystal; and the output of each of these photomultipliers would be stored each time an event occurs. This is illustrated in FIG. 6 for the condition that storage continues until 1,000 light events have occurred. When the last light event in the sequence has occurred, the average output of each photomultiplier is obtained by summing the outputs of each photomultiplier and then dividing by the number of events. From the averaged output of each photomultiplier, the average coordinate $x',y'$ are computed using the computation circuitry of the gamma camera. With this information, the calibration distance can be computed and from the curve of FIG. 3, the confidence factor can be determined and stored in the correction matrix.

Figure 4:
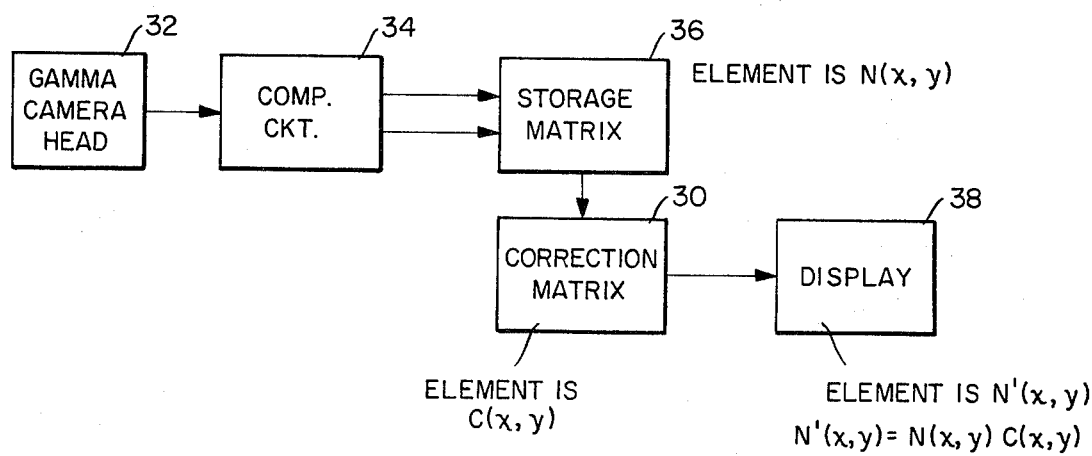
FIG. 4 is a block diagram of an improved gamma camera according to the present invention.

Whichever procedure is followed for obtaining the confidence factors, completion of the calibration process will provide an entry in each of the elements of correction matrix 30 shown in FIG. 4. As shown, the contents of each element is of the form C(x,y) which means that the confidence factor at location x,y in the matrix is C.

In operation, the gamma camera indicated schematically by reference numeral 32 would operate in a conventional manner in collecting data from a radiation field. Computation circuitry 34 may operate as in Reference [1] or Reference [2] for producing the coordinates of each light event. These coordinates are supplied to storage matrix 36 for the purpose of incrementing that element of the matrix associated with a calculated coordinate. As shown in the drawing, the contents of each element is of the form N(x,y) which indicates that the number of events stored in location x,y of the storage matrix is N. That is to say, N represents the actual number of events that have occurred in the crystal at calculated location x,y.

The weighted number of events that have occurred at this location is stored in display matrix 38. An element of this matrix is designated N'(x,y). This symbol indicates that there are N' weighted number of events that occur at location x,y. The weighted number of events at a given location is obtained from the actual number of events at that location by multiplying the actual number by the confidence factor at the given location. As shown, N'(x,y)=[N(x,y)][C(x,y,)].

By utilizing display matrix 38 for display purposes rather than storage matrix 36, it can be seen that the events will be redistributed in accordance with the confidence factors developed during the calibration process. That is to say, the number of events occurring at locations having a relatively low confidence factor will be reduced as compared to locations where the confidence factor is higher. In this manner, the resolution of the camera is significantly improved. Furthermore, the improvement is achievable with any existing type of gamma camera which means that existing gamma cameras can be retrofitted with the correction and display matrices. All that is required is to carry out the above described calibration process and create the correction matrix which is used as a multiplying factor for the storage matrix previously used.

As explained previously, the present invention has for its purpose the evaluation of the probability that the coordinates of an event as calculated by the coordinate computation circuitry of a gamma camera, after taking into account all of the conventional adjustments for dislocation, etc., are the same as the actual coordinates of the event. This purpose can be achieved by associating with the calculated coordinates, an average distribution of outputs of the photodetectors of the gamma camera representative of the distribution due to the occurrence of a large number of events at such coordinates. The cross-correlation of the average distribution with the actual distribution (i.e., the distribution by which the coordinates were calculated) is a measure of the probability that the event causing the actual distribution occurred at the calculated coordinates.

Figure 7:
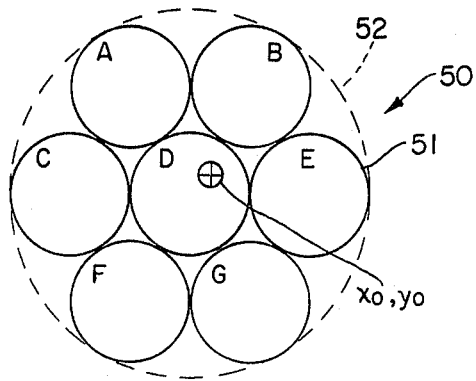
FIG. 7 is a simplified plan view of an array of photomultipliers arranged on a scintillator crystal of a gamma camera.
Figure 8:
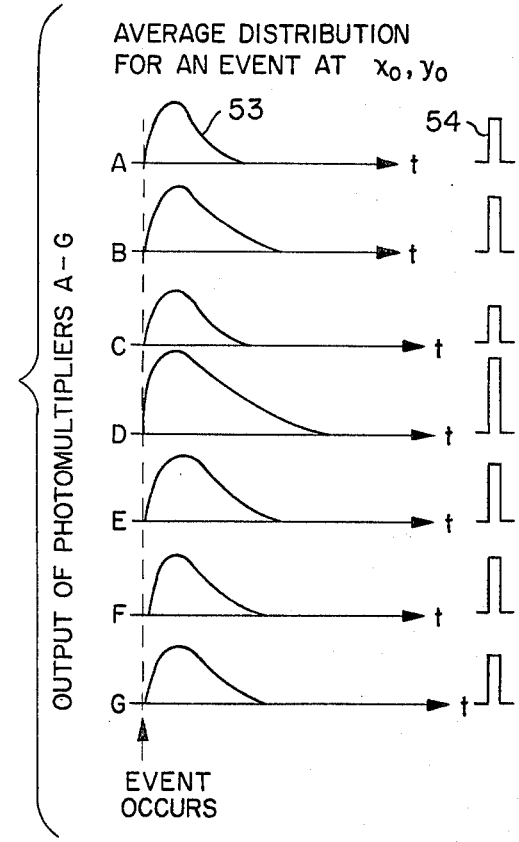
FIG. 8 is a typical average distribution of the outputs of the photomultipliers of FIG. 7 for an event at a predetermined location in the crystal.

Referring now to FIG. 7, reference numeral 50 designates a simplified gamma camera head having seven photodetectors, in the form of a plurality of photomultipliers 51, arrayed over scintillator crystal 52, it being understood that only seven photodetectors are shown in order to simplify the drawing and description of the invention. The photodetectors are identified by reference characters A–G; and each will have an output typically like that shown in FIG. 8 by curves 53 in response to an event that actually occurs at the point $x_o, y_o$. After integration and normalization in a conventional manner, the outputs can be represented by the series of pulses 54, the amplitudes of which are representative of the respective integrations of the outputs of the photomultipliers. It is the integrated signals that are processed by the computation circuitry to establish the calculated coordinates of an event. For other events at the same location, the distribution of outputs of the photodetectors would be different due to the statistics of the process involved. If the distributions were collected for a large number of events, then a so-called average distribution of outputs could be computed by an averaging procedure. The result would be an average distribution of outputs associated with an actual event at the point $x_o, y_o$. The average distribution at the point $x_o, y_o$ can be obtained by using a point radioactive source located to irradiate the crystal precisely at the point $x_o, y_o$, and averaging the output of each photomultiplier over a period of time sufficient to allow a large number of events, say 1,000, to be incident on the point. In this case, unlike the previous case described above, the coordinates of the events are not calculated; only the outputs themselves are accumulated on an individual basis and averaged.

Other average distributions can be obtained at other discrete points over the entire face of the crystal to define a plurality of calibration points. Alternatively, the distributions over many points within a centrally located hexagonally-shaped motif 55 of the pattern of photodetectors can be obtained and the result extrapolated over the entire pattern. Where the overall pattern is large (i.e., where the motif is repeated many times, as for example, when nineteen or thirty photodetectors are arrayed over the crystal) the calibration points in motifs other than the one in which actual measurements are taken can be obtained in a two-step process. Such process takes into account the position of a calibration point in a motif, as well as what is termed the "motif factor" of the motif. The latter, which may be obtained experimentally or analytically, depends upon the location of the motif in the larger pattern. As a further alternative, the distributions can be determined analytically from the spatial distribution of the photodetectors and their known response characteristics.

Figure 9:
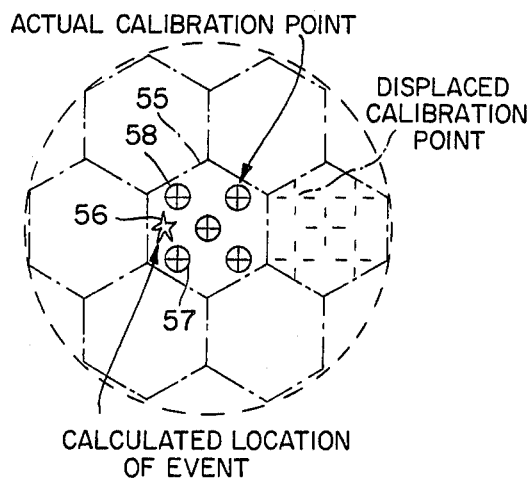
FIG. 9 is a plan view of a scintillator crystal showing the motif of the array pattern, with the calibration points of a motif superimposed thereon.

The manner in which the invention is carried out using the approach described above can be seen from FIG. 9 where it is assumed that an event was caused by an unknown radiation field (not shown), and the gamma camera has computed the coordinates of the event which resulted in the apparent location of the event at location 56. A measure of the probability that the event actually occurred at location 56 can be ascertained by associating with location 56 an average distribution of outputs, for example, by interpolating between a number a calibrations points 57, 58, etc., and then cross-correlating the average distribution with the actual distribution.

The cross-correlation factor that results from the process described above can be normalized so that it has the value of unity if the correlation is 100%, and the value of zero if any no correlation exists. Such factor can be used directly as a measure of the probability that an event calculated to have occurred at a given set of coordinates actually occurred there; or, the factor can be squared to accentuate the effect, or the square root of the factor can be used to reduce the effect. Other functions of the factor can also be used. The factor so obtained can be recorded in a memory by adding the factor, as an increment, to the contents of a cell whose address in a memory matrix is determined by the calculated coordinates of the event that causes the factor to be computed. In such case, the contents of each memory cell will be weighted such that the contents of the memory matrix more closely approaches the actual density distribution of light events as compared to the unweighted matrix.

Instead of using the cross-correlation factor calculated for a given address of an event as the incremental value to be added to the cell of a memory matrix at the same address, a representation of the factor can be stored in another type of memory, namely the screen of a CRT, by modulating the intensity of the beam of the CRT in accordance with the factor. In this case, a representation of the intensity distribution of a radiation field can be recorded on a photosensitive sheet operatively associated with the screen of the CRT. Thus, the present invention contemplates both analog and digital recording of representations of the occurrences of events in the crystal.

Figure 10:
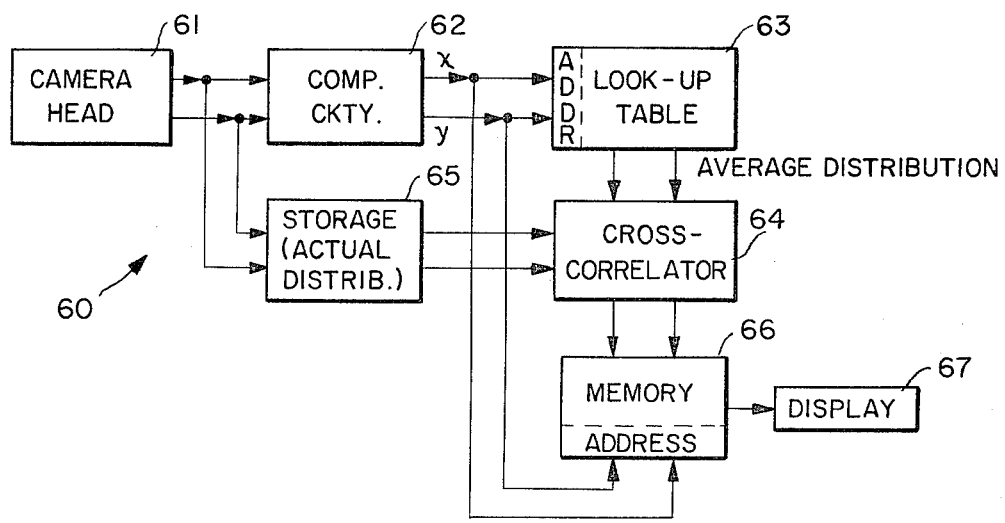
FIG. 10 is a schematic block diagram showing one technique for computing the probability that an event calculated to have occurred at a given location actually occurred at this location.

One form of apparatus for carrying out the present invention is illustrated in FIG. 10 to which reference is now made. Apparatus 60 includes conventional camera head 61 and computation circuitry 62. Camera head 61 includes a scintillation crystal (not shown) responsive to radiation stimuli from a radiation field (not shown) for producing light events at locations where the stimuli interact with the crystal, and an array of photodetectors responsive to a light event for producing individual outputs. Circuitry 62 is responsive to the distribution of outputs of the photodetectors for computing the coordinates of the event that caused the outputs. A consideration of the operation of the apparatus so far described will reveal that many distributions will exist which will result in the calculated coordinates being identical; and the present invention includes means for evaluating the probability that the calculated coordinates of an event are the actual coordinates thereof as described below.

Apparatus 60 includes look-up table 63 containing the average distributions of outputs for the calibration points obtained as described above. With the x,y coordinates of the event produced by circuitry 62 providing the input to the look-up table, an average distribution of outputs can be associated with the calculated coordinates, either directly, if sufficient calibration points have been chosen, or by interpolation. The output of the look-up table is applied to one input of cross-correlator 64, to the other input of which is applied the actual distribution of outputs stored in storage means 65. Cross-correlator 64 is a conventional device well known to those skilled in the art and its construction and operation form no part of the present invention. It performs, in a known manner, a convolution-like multiplication on the two distributions that form the input, and produces as an output, a representation of the degree of correlation between the actual distribution and the average distribution obtained from a calibration operation. The output of cross-correlator 64 is applied to memory 66 which is addressed by the output of circuitry 62 for storing in a cell of the memory a representation of the occurrence of an event at an elemental area of the crystal corresponding to the calculated location of the event.

As explained above, the output of cross-correlator 64 can be recorded to provide a measure of the probability that an event has occurred at its calculated coordinates. Alternatively, a function of the output of the cross-correlator, such as the square of the output or its square root, can be recorded depending on whether the effect of the correlation process is to emphasized or reduced.

Thus, the representation of the occurrence of an event has contained within it the probability that the event actually occurred at the calculated location. Display 67 may be used to display the contents of memory 66 in a conventional manner whereby a map of an unknown radiation field is displayed.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. In a gamma camera having a scintillation crystal responsive to radiation stimuli for producing light events at locations where the stimuli interact with the crystal, an array of photomultipliers responsive to a light event for producing individual outputs, circuitry responsive to said outputs for identifying the elemental area of the crystal within which an event occurs, and a matrix whose elements are in one-to-one correspondence with elemental areas of the crystal, the contents of each element in the matrix being incremented when identified by the circuitry and representing the number of events that have occurred within a predetermined period of time within an elemental area of the crystal corresponding to the location of the element in the matrix whereby the contents of the matrix represents the density distribution of light events in the crystal, the improvement comprising:
weighting the contents of the elements in the matrix such that the weighted contents of the matrix more closely approaches the actual density distribution of light events as compared to the unweighted contents of the matrix.

2. The improvement of claim 1 wherein the contents of each element is weighted in accordance with the probability that an event, identified as having occurred in a given elemental area to which the element corresponds, actually occurred therein.

3. The improvement of claim 2 wherein a calibration procedure is utilized, such procedure involving sequentially impinging a calibration beam of gamma rays on each elemental area of the crystal and calculating, for each elemental area, the calibration distance between the actual location of a light event and the location of the event based on the computation circuitry, and selecting for each elemental area of the crystal a confidence factor functionally related to the inverse of the calibration distance.

4. An improved gamma camera comprising:
(a) a camera head including a scintillation crystal responsive to radiation stimuli from a radiation field for producing light events at locations where the stimuli interact with the crystal, and an array of photodetectors responsive to a light event for producing individual outputs;

(b) circuitry for processing the individual outputs to identify the elemental area of the crystal within which an event occurs;

(c) a storage matrix whose elements are in one-to-one correspondence with the elemental areas of the crystal, the contents of each element in the crystal representing the number of events identified as having occurred within a predetermined period of time within an elemental area of the crystal corresponding to the location of the element in the matrix; and (d) means weighting the contents of the elements in the storage matrix for improving the resolution of the camera.

5. A gamma camera according to claim 4 where the means weighting the contents of the elements of the storage matrix includes a correction matrix whose elements are in one-to-one correspondence with the elements of the storage matrix, the contents of the elements in the correction matrix constituting the weights.

6. A gamma camera according to claim 5 wherein the weight of an element of the correction matrix is in accordance with the probability that an event, identified as having occurred in a given elemental area to which the element corresponds, actually occurred therein.

7. A gamma camera according to claim 5 including means for multiplying the contents of corresponding elements of the storage matrix and correction matrix.

8. A method for improving the resolution of a gamma camera having a scintillation crystal responsive to radiation stimuli from a radiation field for producing light events at locations where the stimuli interact with the crystal, an array of photodetectors responsive to a light event for producing individual outputs, and circuitry for processing the individual outputs to calculate the location of a light event, the method comprising:

(a) sequentially impinging a calibration beam of gamma rays on each elemental area of the crystal;

(b) using the circuitry for calculating the location of each light event;

(c) deriving the average location of events due to impingement of the calibration beam on a given elemental area;

(d) calculating the distance between the actual location of events and the average location for each elemental area to establish a calibration distance associated with the elemental area; and (e) assigning a confidence factor to an event in a given elemental area in accordance with the calibration distance associated with the elemental area.

9. A method according to claim 8 wherein the confidence factor is functionally related to the inverse of the calibration distance.

10. In a nuclear imaging device having a scintillation crystal responsive to radiation stimuli for producing light events at locations where the stimuli interact with the crystal, an array of photodetectors responsive to a light event for producing a set of individual outputs, circuitry responsive to respective sets of said outputs for computing the coordinates of events, and a matrix whose elements are in one-to-one correspondence with elemental areas of the crystal for recording a representation of the occurrences of events at their calculated coordinates whereby the contents of the matrix represents the density distribution of light events in the crystal, the improvement comprising:

weighting the contents of the elements in the memory such that the weighted contents of the memory more closely approaches the actual density distribution of light events as compared to the unweighted contents of the memory.

11. The improvement of claim 10 wherein the contents of each element is weighted in accordance with a measure of the probability that events, identified as having occurred in a given elemental area to which the element corresponds, actually occurred therein.

12. The improvement of claim 11 wherein a calibration procedure is utilized, such procedure involving sequentially impinging a calibration beam of gamma rays on elemental areas of the crystal and calculating, for each elemental area, the calibration distance between the actual location of a light event and the location of the event based on the computation circuitry, and selecting for each elemental area of the crystal a confidence factor functionally related to the inverse of the calibration distance.

13. A method for using a gamma camera having a scintillation crystal responsive to radiation stimuli from a radiation field for producing light events at locations where the stimuli interact with the crystal, an array of photodetectors responsive to a light event for producing a distribution of individual outputs, and computation circuitry responsive the distribution of outputs produced by the occurrence of an event for calculating its coordinates, the method comprising:

(a) calculating the coordinates of an event from the actual distribution of outputs produced by the photodetectors when a light event occurs in the crystal;

(b) associating with the calculated coordinates an average distribution of outputs of the photodetectors representative of the distribution due to the occurrence of a number of events at said calculated coordinates; and (c) cross-correlating the average distribution with said actual distribution.

14. A method according to claim 13 wherein the average distribution is obtained analytically in accordance with the spatial distribution of the photodetectors on the crystal.

15. A method according to claim 13 wherein the average distribution is obtained by a calibration process which includes creating a number of events at each of a plurality of locations, and recording the average distribution of outputs for each known location.

16. A method according to claim 15 wherein the average distribution at the location defined by the calculated coordinates is obtained by interpolation using average distributions at known locations adjacent the location defined by the calculated coordinates.

17. A method according to claim 15 wherein the known locations are within one motif of a repeated pattern of the array of photodetectors, and the average distribution for locations in other motifs of the pattern are obtained by similarity.

18. A method according to claim 13 including recording in a memory, at a location determined by the calculated coordinates, a representation of the probability that an event occurred at the calculated coordinates.

19. A method according to claim 18 including displaying the contents of the memory.

20. A gamma camera comprising:

(a) a gamma camera including a scintillation crystal responsive to radiation stimuli from a radiation field for producing light events at locations where the stimuli interact with the crystal, and an array of photodetectors responsive to a light event for producing a distribution of individual outputs;

(b) computation circuitry responsive to the distribution of outputs produced by the occurrence of an event for calculating its coordinates;

(c) means for evaluating the probability that the calculated coordinates of an event are its actual coordinates.

21. A gamma camera according to claim 20 including a storage means for storing a representation of the occurrence of an event at its calculated coordinates taking into account the probability that such event actually occurred at the calculated coordinates.

22. A gamma camera according to claim 21 including means for displaying the contents of said storage.

23. A gamma camera according to claim 20 including means for storing a representation of the radiation field in terms of the probability that the calculated coordinates of events produced in the crystal by the radiation field actually occurred at the calculated coordinates.

24. A gamma camera according to claim 23 including means for displaying the stored representation of the radiation field.

25. A gamma camera according to claim 20 wherein the means for evaluating includes correlation means for cross-correlating a distribution of outputs of the photodetectors caused by an event with a reference distribution of outputs associated with the calculated coordinates of the event.

26. A gamma camera according to claim 25 wherein the means for evaluating includes a memory for recording, at a location established by the calculated coordinates of an event, an increment whose value is functionally related to the output of the correlation means.

27. A gamma camera according to claim 26 wherein the memory is a matrix, and recording is carried out by incrementing the memory at the address specified by the calculated coordinates of the event with a function of the output of the correlation means.

28. A gamma camera according to claim 27 wherein the memory is incemented at addresses adjacent the address specified by said calculated coordinate with a function of the output of the correlation means evaluated at the adjacent addresses.

* * * * *